May 23, 1950     O. W. HOLDEN     2,508,827
FAUCET REDUCER
Filed Nov. 5, 1948
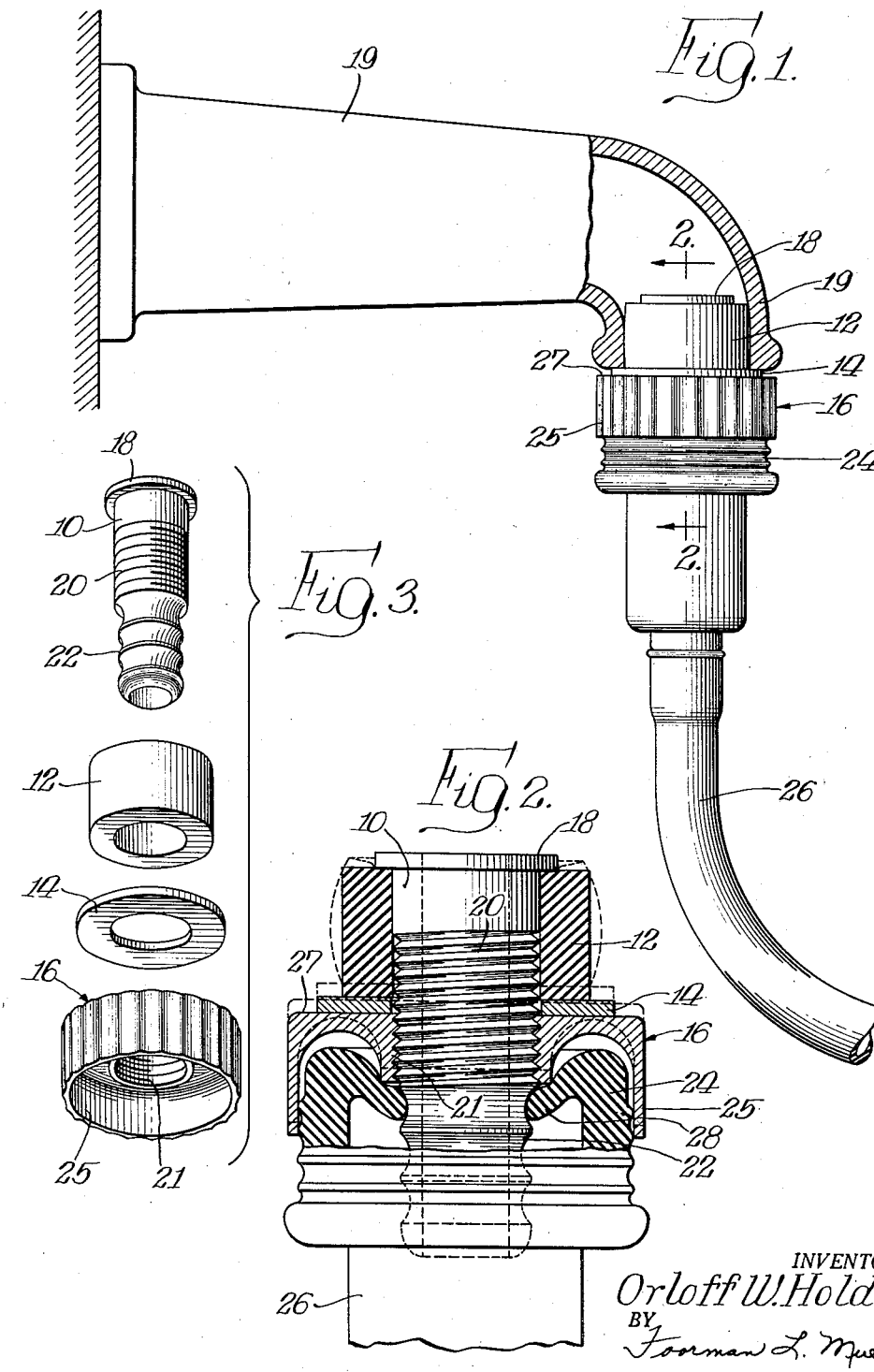
INVENTOR.
Orloff W. Holden,
BY
Foorman L. Mueller
Atty.

Patented May 23, 1950

2,508,827

UNITED STATES PATENT OFFICE 2,508,827

FAUCET REDUCER

Orloff W. Holden, Chicago, Ill., assignor to Orloff W. Holden and Marguerite H. Holden, doing business as Knickerbocker Rubber Company, not Inc., Chicago, Ill., a partnership Application November 5, 1948, Serial No. 58,430

5 Claims. (Cl. 285—90)

This invention relates to improvements in a faucet reducer for coupling a hose connector of relatively small diameter to a faucet of larger diameter.

A faucet reducer customarily comprises a mounting portion which fits on or in the mouth of a faucet, and a protruding stem or nipple portion on which a hose connector or the like is fitted. In a prior type of faucet reducer, a wing nut threaded on the stem was employed to compress a rubber bushing or washer after the same had been inserted in the mouth of a faucet, thus causing the sides of the washer to bulge out against the faucet wall for holding the reducer in place. The rubber hose connector was frictionally fitted onto the stem and retained thereon by its inherent resiliency. Not infrequently the water pressure would overcome this resilient force of the rubber, thereby causing the hose connector to swell and pop loose. It is a primary object of the present invention to overcome this annoying feature of prior faucet reducers.

Another object of the invention is to provide novel constraining means to prevent the hose connector from swelling because of water pressure to the point where it is dislodged from the stem of the reducer.

A further object is to adapt the nut of a faucet reducer for the dual purpose of attaching the reducer to the faucet and preventing the expansion of the hose connector at the place where it fastens onto the reducer.

A still further object is to provide a more useful faucet reducer at approximately the same cost as formerly.

A feature of the invention is the improved nut on the reducer, which has a sleeve or skirt portion that surrounds the portion of the rubber hose connector which seats on the nipple. This prevents the hose connector from expanding and being unseated due to the water pressure within the hose.

Another feature is the dual function of the nut, this member serving both to compress the washer and to hold the hose on the nipple.

The foregoing and other objects, features and advantages of the invention will be better understood from a study of the following detailed description taken in conjunction with the accompanying drawing, wherein:

Fig. 1 is a side elevational view showing a faucet reducer embodying the invention, together with the associated parts of the faucet and hose;

Fig. 2 is a vertical, sectional view on the line 2—2 of Fig. 1; and

Fig. 3 is an exploded perspective view of the faucet reducer.

In practicing the invention, a sleeve nut is threaded on the stem of the reducer, with the sleeve portion of the nut extending toward the outlet end of the stem and the face portion of the nut disposed toward the compressible washer. The washer and the upper end of the stem are inserted in the mouth of the faucet, and the nut is turned to compress and bulge the washer until the reducer is firmly secured to the faucet. The connector for the hose then is fitted on the stem and is received within the sleeve nut, which embraces the hose connector without any appreciable clearance. Any tendency of the water pressure to expand the hose connector is resisted by the sleeve nut, so that the connector remains as firmly seated as though there were no internal water pressure exerted thereon.

Referring now to the drawings, the faucet reducer comprises a stem or nipple portion 10, a washer 12 of resilient material such as rubber, a flat metallic washer 14 and a sleeve nut 16. An annular lip or shoulder 18 is formed on the upper end of the stem 10, and the rubber washer 12 bears against this shoulder 18. The washer 14 seats against the end of the faucet 19, as shown in Fig. 1. The stem 10 has a threaded portion 20 on which the central thread portion 21 of the sleeve nut 16 is threaded. The stem 10 also has a fluted or corrugated lower portion 22 on which the rubber hose connector 24 is adapted to fit. The rubber hose 26 is fastened to the connector 24.

To install the faucet reducer on a faucet such as 19, the upper portion of the reducer, including the compressible washer 12, is inserted in the mouth of the faucet. The initial shape of the washer 12 is indicated by full lines in Fig. 2. The nut 16 then is turned to apply force on the washer 12. As shown, the nut 16 has a skirt or sleeve portion 25 with a fluted or knurled outer surface to facilitate gripping thereof, and a face portion 27 which bears against the washer 14. As the nut 16 is tightened, the face portion 27 exerts pressure on the washer 12 so that the sides of the washer 12 tend to bulge out, as indicated by the broken lines in Fig. 2. This action is resisted by the mouth of the faucet 19, causing the washer 12 to be compressed tightly against the inside of the faucet, thereby securing the reducer thereto.

The connector portion 24 of the hose 26 is received in the hollow interior of the nut 16. The connector 24 has an inwardly turned lip 28 which fits tightly on the corrugated section 22 of the stem 10. The sleeve nut 16 preferably has an internal diameter such that it fits snugly around the outside of the connector 24.

The hose connector 24 normally has a sufficiently tight grip on the stem 10 of the reducer such that there is no tendency for the connector to become dislodged due to the internal water pressure. However, if the hose 26 should be sharply bent or otherwise obstructed, the water pressure within the hose increases, and in the past this has caused the connector 24 to swell and pop loose. In the present faucet reducer this is impossible, because the sleeve or skirt of the nut 16 prevents any outward expansion of the connector 24, so that the lip 28 remains firmly seated on the corrugated part 22 of the stem 10 at all times.

It will be appreciated from the foregoing description that I have greatly improved the older form of faucet reducer by using a sleeve nut 16 in place of the wing nut formerly employed. My new faucet reducer furthermore presents an attractive appearance, which may be enhanced by chromium plating the nut 16.

While the invention has been illustrated and described with reference to a preferred embodiment thereof, it should be understood that modifications of such embodiment can be effected within the full intended scope of the invention as set forth in the appended claims.

I claim:

1. A one-piece nut for a faucet reducer of the type having a resilient washer adapted to be compressed within the mouth of a faucet and also having a stem with threads thereon and with a corrugated part on which the connector portion of a flexible hose is frictionally fitted, said nut including a body portion having a central threaded opening therein for being screwed onto the threads of the stem, a face portion on said body portion for operative connection with the resilient washer to compress the same by screw action, and integral means projecting from said body portion axially away from said face portion to define a space for receiving the hose connector portion on the stem and to restrain the connector portion from being expanded radially by fluid pressure within the hose, said projecting means having a limited depth of engagement with the hose connector portion much less than the outer diameter of the connector portion.

2. A one-piece annular sleeve nut for a faucet reducer of the type having a resilient washer adapted to be compressed within the mouth of the faucet and also having a stem with threads thereon and with a corrugated part on which the connector portion of a flexible hose is frictionally fitted, said nut including a body portion having a central threaded opening therein for being screwed onto the threads of the stem, a face portion on said body portion for operative connection with the resilient washer to compress the same by screw action, and a skirt portion projecting from said body portion to define a space for receiving the hose connector portion and to restrain the connector portion from being expanded radially by fluid pressure within the hose.

3. A faucet reducer for coupling the connector portion of a flexible hose to a faucet, such reducer comprising a hollow stem for receiving the hose connector thereon, and fastening means for securing said stem to the faucet, said fastening means including a nut threaded onto said stem and having skirt means projecting axially from the periphery thereof for embracing the hose connector and restraining radial expansion thereof due to fluid pressure in the hose, with said skirt means and said stem being so related to each other as to permit axial movement of the connector along said stem while at the same time being relatively positioned to restrain the radial expansion of the connector when the same is seated on said stem.

4. Apparatus for coupling a flexible hose to a faucet, comprising an enlarged resilient connector on the end of the hose, said connector having an inwardly turned annular lip at the open end thereof, a hollow stem having an externally threaded portion and also having a corrugated portion on which said lip seats to retain said connector on said stem, and means for fastening said stem to the faucet including a nut having an internally threaded central portion cooperating with the externally threaded portion of said stem, said nut having integral means projecting axially from the periphery thereof embracing said connector and restraining radial expansion thereof due to fluid pressure in the hose, with said integral means and said stem being so related to each other and to said connector to permit axial movement of said connector along said stem and to restrain the radial expansion of said connector when seated on said stem.

5. Apparatus for coupling a flexible hose to a faucet comprising, an enlarged resilient connector on the end of the hose, said connector having an inwardly turned annular lip at the open end thereof, a hollow stem having a corrugated portion on which said lip seats for retaining said connector on said stem, a resilient washer on said stem insertable in the faucet, and a nut having a screw-threaded connection with said stem, said nut including a face portion for operative connection with said washer to compress the same by screw action and also having an axially projecting skirt portion of such configuration to permit axial movement of the connector along said stem and to restrain radial expansion of said connector due to fluid pressure within the hose.

ORLOFF W. HOLDEN.

REFERENCES CITED

The following references are of record in the file of this patent:

UNITED STATES PATENTS

| Number | Name | Date |
| --- | --- | --- |
| 590,590 | Prevet | Sept. 28, 1897 |
| 872,001 | Massie | Nov. 26, 1907 |
| 966,748 | Honecker | Aug. 9, 1910 |
| 1,558,161 | Gunderson | Oct. 20, 1925 |
| 2,152,429 | Cave | Mar. 28, 1939 |